United States Patent [19]

Fujimura et al.

[11] Patent Number: 4,688,899
[45] Date of Patent: Aug. 25, 1987

[54] DUAL-FREQUENCY, DIELECTRIC ANISOTROPY LIQUID CRYSTAL DISPLAY

[75] Inventors: Koh Fujimura; Kenzo Endo, both of Tokyo, Japan

[73] Assignee: Casio Computer Co., Ltd., Tokyo, Japan

[21] Appl. No.: 754,397

[22] Filed: Jul. 11, 1985

[30] Foreign Application Priority Data

Jul. 27, 1984 [JP] Japan ................. 59-113437
Aug. 29, 1984 [JP] Japan ................. 59-179881

[51] Int. Cl.$^4$ ............... G02F 1/137; C09K 19/52
[52] U.S. Cl. ................. 350/346; 252/299.01; 350/350 R
[58] Field of Search .......... 350/346, 344, 349, 334, 350/350 R; 252/299.01, 299.63, 299.64, 299.67

[56] References Cited

U.S. PATENT DOCUMENTS

| | | | |
|---|---|---|---|
| 3,799,649 | 3/1974 | Carlyle | 350/343 |
| 3,978,580 | 9/1976 | Leupp et al. | 350/344 X |
| 4,009,934 | 3/1977 | Goodwin et al. | 350/346 |
| 4,236,155 | 11/1980 | Nagata | 350/346 |
| 4,317,115 | 2/1982 | Kawakami et al. | 340/784 |
| 4,386,836 | 6/1983 | Aoki et al. | |
| 4,394,067 | 7/1983 | Spruijt | 350/334 |
| 4,550,981 | 11/1985 | Petrzilka | 350/346 X |
| 4,559,161 | 12/1985 | Takei et al. | 350/346 |
| 4,566,756 | 1/1986 | McDonnell et al. | 350/346 |
| 4,575,190 | 3/1986 | Wood et al. | 350/343 |
| 4,609,256 | 9/1986 | Nakamura | 350/346 |

FOREIGN PATENT DOCUMENTS 0065928 3/1980 Japan ................. 350/344

Primary Examiner—John K. Corbin
Assistant Examiner—David Lewis
Attorney, Agent, or Firm—Frishauf, Holtz, Goodman & Woodward

[57] ABSTRACT

A liquid crystal apparatus has first and second liquid crystal substrates opposing each other. Segment electrodes are formed on the inner surface of the first substrate. Common electrodes are formed on the inner surface of the second substrate. Seal members seal a liquid crystal composition in a predetermined region between the segment electrodes and the common electrodes. Light shutters are formed by these electrodes and the liquid crystal composition sealed therebetween. In order to reduce influence of a hysteresis effect in the liquid crystal composition when a high frequency electric field is applied, the liquid crystal composition has a dielectric scattering phenomenon in which its dielectric anisotropy in response a low frequency electric field is larger than the absolute value of its dielectric anisotropy in response a high frequency electric field.

20 Claims, 25 Drawing Figures

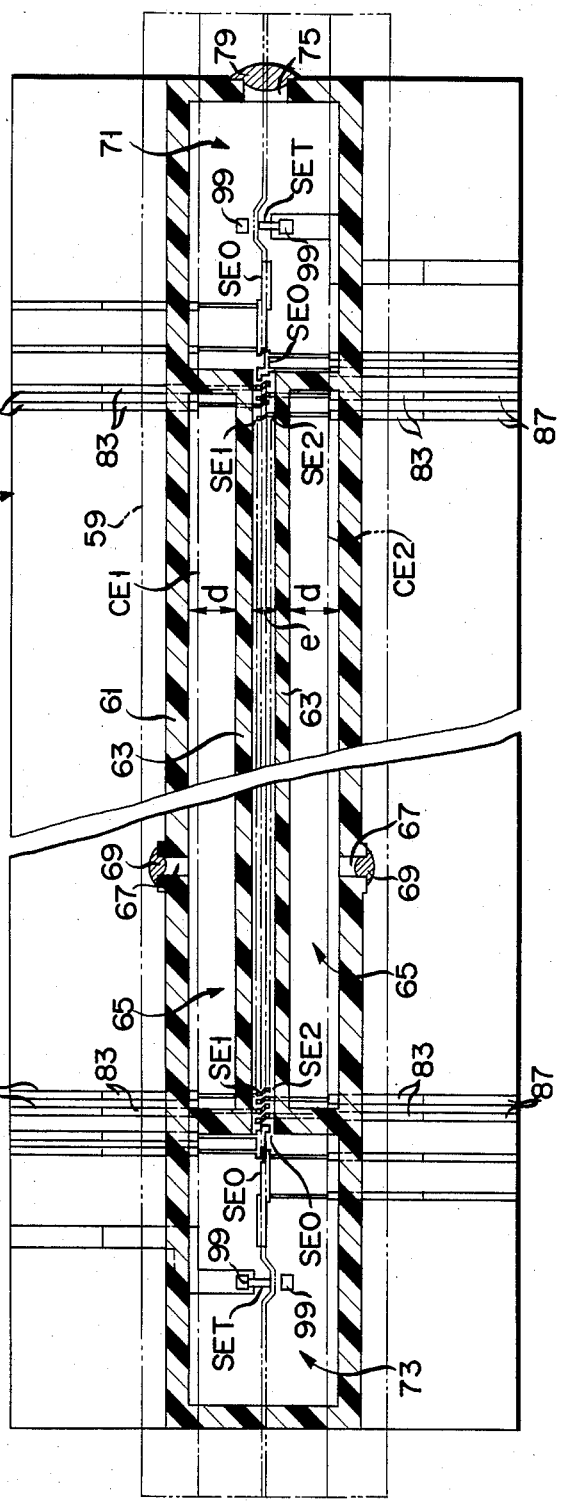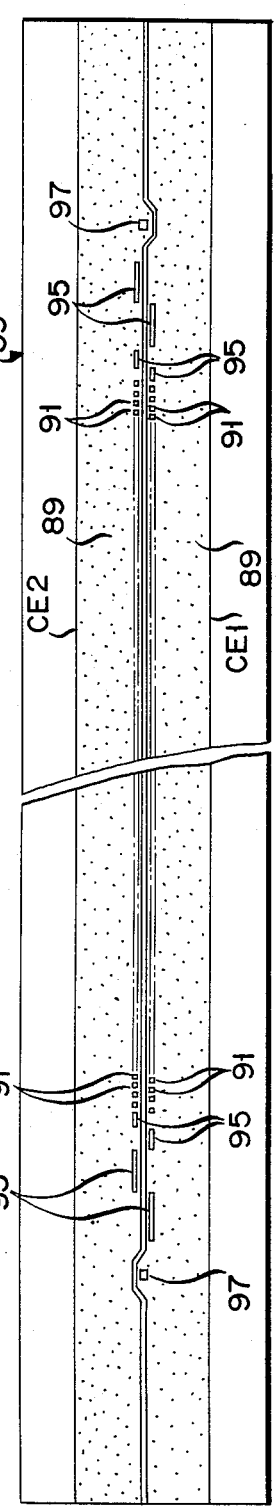

F I G. 12
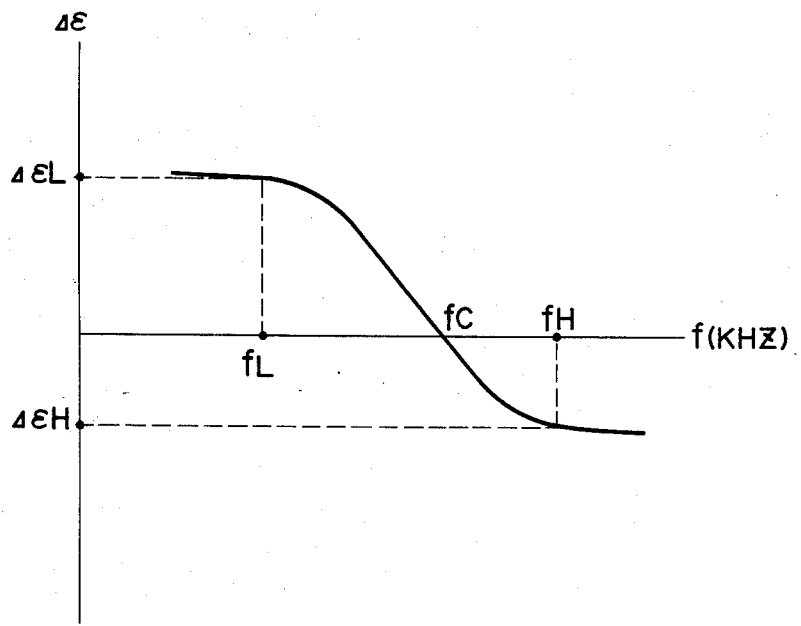

DUAL-FREQUENCY, DIELECTRIC ANISOTROPY LIQUID CRYSTAL DISPLAY

BACKGROUND OF THE INVENTION

The present invention relates to improvements in a liquid crystal apparatus.

Recently, liquid crystal apparatuses are applied in image display apparatuses such as television receivers and computer displays, computer terminals, and electrophotographic printers used as office equipment or the like.

A liquid crystal apparatus used in an image display or an electrophotographic printer comprises a plurality of light shutters (microshutters) which are densely arranged in order to control a light transmission amount. The light shutters comprise a liquid crystal composition layer, a pair of opposing substrates sandwiching the liquid crystal layer therebetween, and opposing electrodes respectively formed on the substrates. Such a liquid crystal apparatus is described in, e.g., U.S. Pat. No. 4,386,836.

The liquid crystal apparatus is generally driven in such a manner that voltages higher or lower than a threshold voltage of an electro-optic effect are selectively applied to the shutters. However, in this driving method, operation time of the apparatus is delayed. For example, in the case of using a liquid crystal composition having a positive dielectric anisotropy, when a voltage higher than a threshold voltage is applied, liquid crystal molecules are operated immediately. However, when a voltage lower than the threshold voltage is applied and the liquid crystal molecules are aligned parallel to the substrate, the liquid crystal molecules have poor response time. This is because the liquid crystal molecules are operated only by an alignment regulating force acting between the liquid crystal composition and an alignment film on the substrate.

For this reason, when the light shutters must be driven at high speed so as to obtain high contrast, a so-called two frequency addressing scheme is adopted.

According to the two frequency addressing scheme, when a high frequency electric field is applied to the liquid crystal composition, the liquid crystal molecules are aligned to be perpendicular to the applied electric field. When a low frequency electric field is applied, the liquid crystal molecules are aligned to be parallel to the electric field. In this addressing scheme, the electric field is applied to the liquid crystal composition whether the liquid crystal molecules are to be aligned parallel or perpendicular to the substrates. For this reason, the liquid crystal molecules can always be operated at high speed. In a liquid crystal apparatus of positive-display TN type (twisted nematic type: polarization axes of polarizing plates are perpendicular to each other) driven according to this scheme, when a high frequency voltage is applied, shutters are opened (light can be transmitted), and when a low frequency voltage is applied, the shutters are closed (light cannot be transmitted). In a liquid crystal of G-H type (guest-host effect type), when a high frequency voltage is applied, shutters are closed (light cannot be transmitted, i.e., the shutters are colored), and when a low frequency voltage is applied, the shutters are opened (light can be transmitted, i.e., the shutters are not colored).

When the liquid crystal apparatus is driven by the two frequency addressing scheme, high frequency (100 kHz or higher) and low frequency electric fields are applied. In this case, the response time of the liquid crystal composition is rendered poor when a low frequency electric field is applied after a high frequency electric field has been applied to the liquid crystal composition for a long period of time. This drawback is caused by a hysteresis effect (high frequency hysteresis effect) of the liquid crystal composition. The hysteresis effect of the liquid crystal composition is notable particularly when a high frequency voltage is applied. For this reason, if a high frequency voltage is applied for a long period of time, its influence remains in the liquid crystal composition considerably. Thus, when a low frequency voltage is applied, the liquid crystal composition does not respond quickly. In other words, when a high or low frequency electric field is applied, the liquid crystal molecules are aligned to be parallel or perpendicular to the plane of substrates. In this case, the liquid crystal molecules are not completely aligned parallel or perpendicular to the plane of substrates but are operated within a given range. However, when the high frequency electric field is applied for a long period of time, the liquid crystal molecules are almost completely aligned parallel to the plane of substrates. Therefore, when the high frequency electric field is applied for a long period of time, and the low frequency electric field is applied thereafter, the liquid crystal molecules do not respond quickly.

Influence of the hysteresis effect of a high frequency electric field depends on the strength of such electric field applied to the liquid crystal composition. If the applied electric field is strong, the hysteresis effect due to the high frequency voltage is considerable.

For this reason, when the conventional liquid crystal apparatus is driven by the two frequency addressing scheme, in the case of positive-display TN type, an operation for switching the shutters from an open state to a close state becomes slow. In the G-H type liquid crystal apparatus, an operation for switching shutters from a close state to an open state becomes slow. Therefore, contrast between the shutter closed and open states may be incorrect.

For example, when a conventional liquid crystal apparatus used in an electrophotographic printer is driven by the two frequency addressing scheme, in the case of the TN type, some initially printed pixels become defective or are not printed due to a delay in the closing operation of the shutters. In the G-H type liquid crystal apparatus, some finally printed pixels are left printed due to a delay in the opening operation of the shutters.

This drawback is particularly notable in a liquid crystal apparatus in which the shutters are arranged in a matrix and are time-divisionally driven by the two frequency addressing scheme. This is because, in this case, high frequency components of the electric field applied to the liquid crystal composition increase.

Moreover, in a liquid crystal apparatus using a narrow rectangular liquid crystal shutter portion (a portion in which the liquid crystal composition forming the light shutters is sealed), a width of a cell container in which the liquid crystal composition is sealed is small. For this reason, the cell container cannot deform upon expansion or shrinkage of the liquid crystal composition due to a change in ambient temperature. As a result, in accordance with a change in ambient temperature, the liquid crystal composition in the cell container has high or low pressure. When the composition in the cell container has low pressure, air bubbles can be formed in the shutter portion. When the composition in the cell container has high pressure, the liquid crystal composition can leak. Therefore, the liquid crystal apparatus with the above arrangement has poor reliability with respect to a change in ambient temperature.

SUMMARY OF THE INVENTION

It is an object of the present invention to provide a liquid crystal apparatus suitable for a two frequency addressing scheme which has good response time and high reliability with respect to a change in ambient temperature.

According to the present invention, there is provided a liquid crystal apparatus comprising:

first and second substrates opposing each other;

at least one first electrode formed on an inner surface of the first substrate;

at least one second substrate formed on an inner surface of the second electrode;

a liquid crystal composition sandwiched between the first and second electrodes and exhibiting a dielectric scattering phenomenon in which a dielectric anisotropy with respect to an applied electric field having a low frequency is larger than an absolute value of a dielectric anisotropy with respect to an applied electric field having a high frequency; and a seal member for sealing the liquid crystal composition in a predetermined space between the first and second liquid crystal substrates.

In the liquid crystal apparatus with the above arrangement, a liquid crystal composition is used which exhibits a dielectric scattering phenomenon in which a dielectric anisotropy with respect to an applied electric field having a low frequency is larger than an absolute value of a dielectric anisotropy with respect to an applied electric field having a high frequency. For this reason, even if a high frequency voltage is applied between the first and second electrodes for a long period of time, influence due to a high frequency hysteresis effect in the composition is small. Therefore, if a low frequency voltage is applied between the electrodes thereafter, liquid crystal molecules can respond quickly. Thus, a liquid crystal apparatus having good response time and contrast can be provided.

BRIEF DESCRIPTION OF THE DRAWINGS

FIG. 5 is a sectional view taken along a line V—V in FIG. 4;

FIG. 6 is a plan view showing an inner surface of another substrate of the liquid crystal apparatus;

FIG. 12 is a view for explaining the relationship between a frequency of the applied electric field and a dielectric anisotropy of the liquid crystal composition.

DETAILED DESCRIPTION OF THE PREFERRED EMBODIMENT

A liquid crystal apparatus according to an embodiment of the present invention used in, e.g., an electrophotographic printer will be described with reference to the accompanying drawings.

Figure 1:
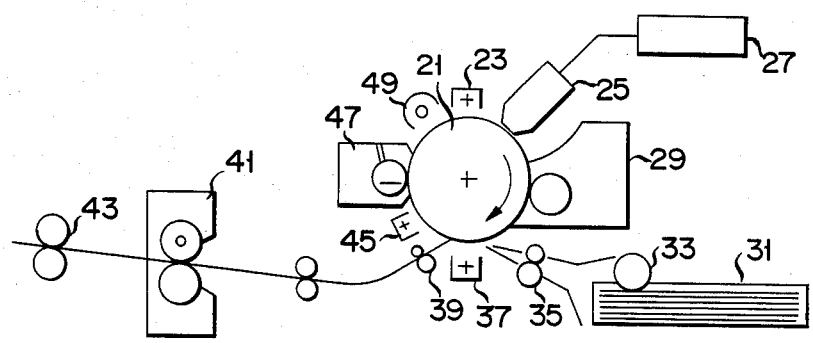
FIG. 1 is a schematic view showing an electrophotographic printer using a liquid crystal apparatus according to an embodiment of the present invention.

First, an arrangement of an electrophotographic printer will be described with reference to FIG. 1. Note that a basic arrangement of the electrophotographic printer has been described in, e.g., U.S. Pat. No. 4,386,836, as described above.

A charger 23 is provided adjacent to a photoconductive photosensitive drum 21. The charger 23 evenly charges a surface of the drum 21. An optical writing unit 25 optically writes data in the surface of the drum 21. A writing controller 27 controls the unit 25 in accordance with externally supplied writing data. The unit 25 radiates light dots onto the surface of the drum 21, thus discharging charges on the portion irradiated with light. Thus, an electrostatic latent image is formed on the surface of the drum 21 by dots. The latent image is developed by a developer 29, and a toner image is formed on the surface of the drum 21.

Printing paper 31 is fed from a roller 33. The paper 31 fed from the roller 33 is temporarily stopped by a standby roller 35. The paper 31 is fed to a transfer unit 37 in synchronism with the toner image formed on the surface of the drum 21. The paper 31 is peeled from the drum 21 by a separator 39. The toner image is fixed on the paper 31 by a fixer 41, and the paper is exhausted by a roller 43. After transferring the toner image on the paper 31, toner particles remaining on the drum 21 are electrically neutralized by a discharger 45. The residual toner is cleaned by a cleaner 47. The charge of the surface of the drum 21 is canceled and equalized by an eraser 49.

Figure 2:
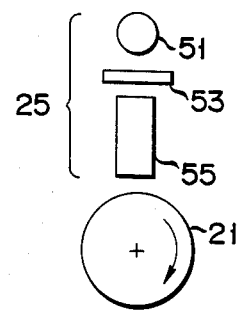
FIG. 2 is a schematic view of an optical writing unit of the printer shown in FIG. 1.

The optical writing unit 25 will be described in more detail with reference to FIG. 2. The unit 25 is constituted by a light source 51, a liquid crystal apparatus 53 and an imaging lens 55. When light shutters of the apparatus 53 are turned on, light emitted from the light source 51 passes through the shutters and the lens 55, and is radiated on the surface of the drum 21. Thus the lens 55 forms an image of opening shutters on the drum 21 as many light dots. When the shutters of the apparatus 53 are turned off, light emitted from the light source 51 is shielded by the shutters and does not reach the drum 21.

The liquid crystal apparatus 53, e.g., a G-H type liquid crystal apparatus will be described with reference to FIGS. 3 to 8.

Figure 3:
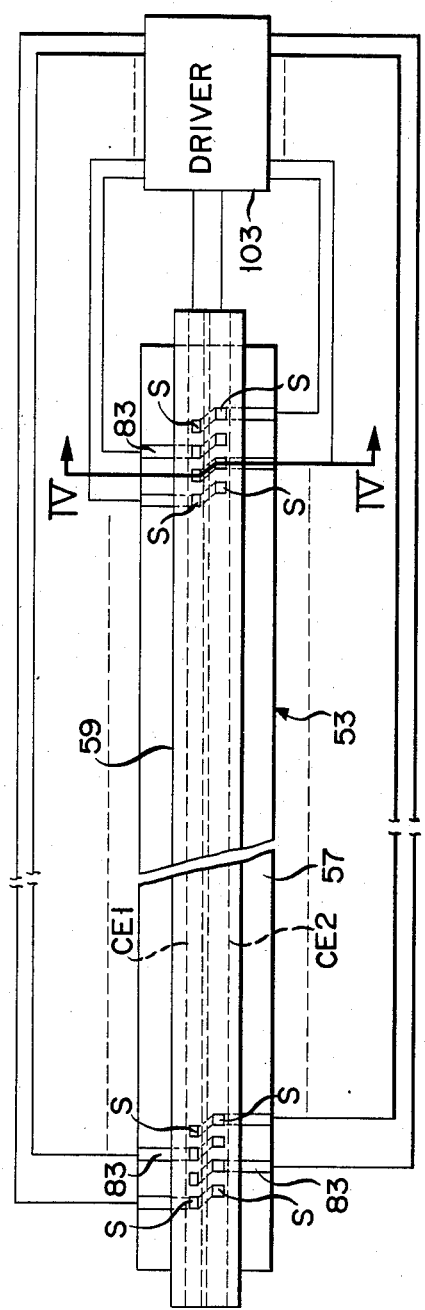
FIG. 3 is a top view of the liquid crystal apparatus according to the embodiment of the present invention.

Assume that the liquid crystal apparatus 53 is formed to extend along the axial direction of the drum 21, as shown in FIG. 3. A plurality of light shutters S for controlling transmission of light are formed in two rows at constant intervals.

Figure 4:
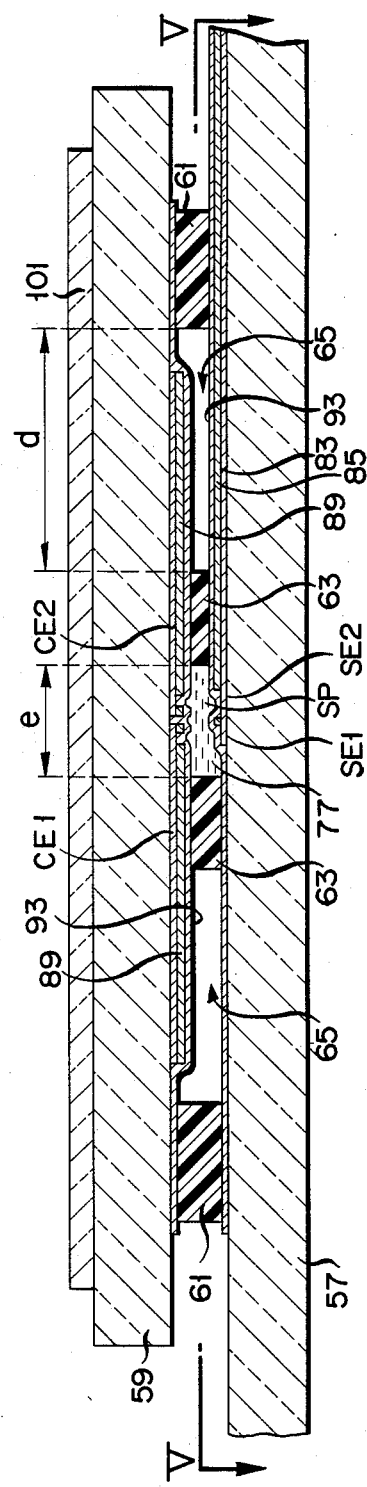
FIG. 4 is a sectional view taken along a line IV—IV in FIG. 3.

The apparatus 53 comprises a pair of opposing transparent substrates 57 and 59 (FIG. 4). The transparent substrates 57 and 59 are formed of, e.g., a 0.7 mm-thick glass plate. The substrate 57 and 59 are adhered to each other through a frame-like outer seal member 61 and a pair of inner seal members 63 formed to be parallel to each other (FIGS. 4 and 5). Each inner seal member 63 is formed inside the outer seal member 61 spaced by a gap d of about 3 mm. The length of a small-gap portion (a liquid crystal shutter portion SP to be described later) between the inner seal members 63, i.e., the length of the inner seal members 63 is set to be 249 mm. Note that this length is set when the liquid crystal apparatus is used in a printer using for the maximum B4-size paper. The inner seal members 63, the outer seal member 61 and the substrates 57 and 59 form spaces 65 (FIGS. 4 and 5). Vent holes 67 are formed in the outer seal member 61 to communicate with the spaces 65 (FIG. 5). The holes 67 are provided so as to externally evacuate air between the substrates 57 and 59. The holes 67 are sealed by seal members 69. The seal members 69 are coated after, e.g., adhering the substrates 57 and 59. Therefore, air (clean air) which is left when the substrates 57 and 59 are adhered is sealed in the spaces 65.

Two ends of the small-gap portion (the liquid crystal shutter portion SP) between the members 63 communicate with liquid crystal reservoir portions 71 and 73. The portions 71 and 73 are surrounded by the substrates 57 and 59, the inner seal members 63 and the outer seal member 61. The portions 71 and 73 are formed to be a rectangular box shape having a broad width. A liquid crystal filling hole 75 is formed in one of the portions 71 and 73 (in this embodiment in the portion 71). The hole 75 is formed on the central line along the width direction of the small-gap portion of the members 63. The hole 75 also serves as a vent hole for externally evacuating air between the substrates 57 and 59 when the substrates 57 and 59 are adhered to each other. A liquid crystal composition 77 is filled in the small-gap portion of the members 63 (the liquid crystal shutter portion SP) and in the portions 71 and 73 through the hole 75. The liquid crystal composition 77 is filled by, e.g., a vacuum filling method. After filling the liquid crystal composition 77, the hole 75 is sealed by coating a seal member 79. Note that the portions 71 and 73 are not directly associated with operation of the light shutters S, and simply store the composition 77.

Figure 7:
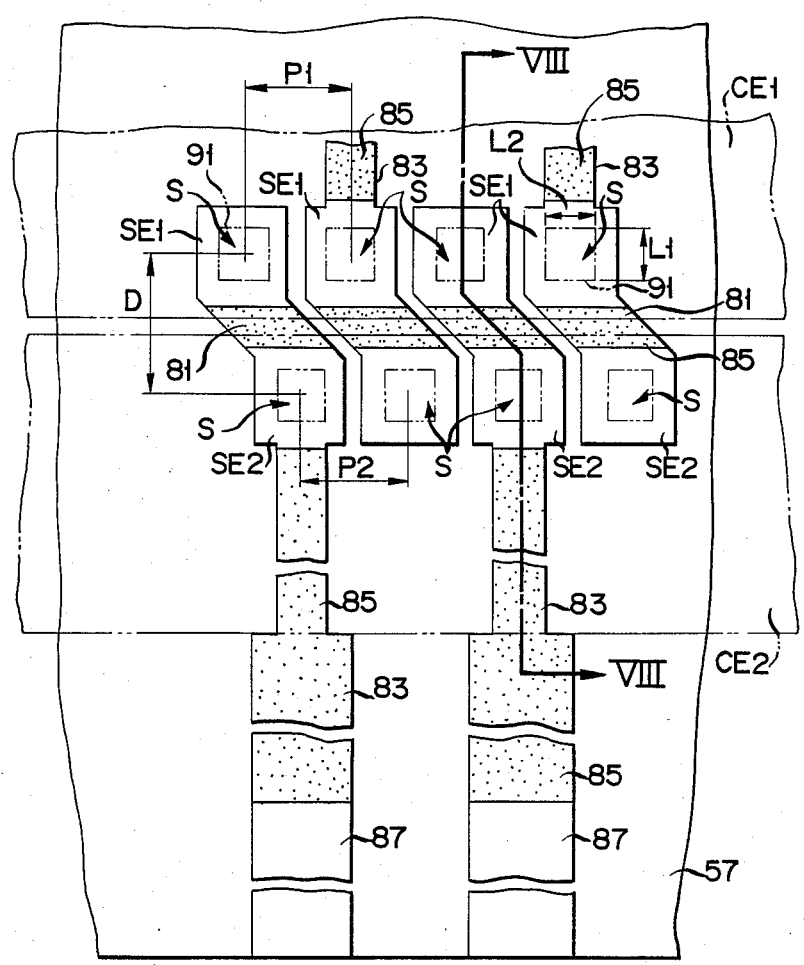
FIG. 7 is an enlarged view showing a portion near segment electrodes of FIG. 5.

A plurality of segment electrodes are formed on an inner surface of the substrate 57 (to be referred to as a segment substrate hereinafter) (FIGS. 4, 5 and 7). These segment electrodes are formed on the small-gap portion between the members 63 in a two-row matrix form. Each segment electrode is formed to be an almost square shape having one side of about 180 $\mu$m. The segment electrodes constituting one row are referred to as electrodes SE1, and the segment electrodes constituting the other row are referred to as electrodes SE2 hereinafter. A common electrode CE1 is formed on an inner surface of the other substrate 59 (to be referred to as a common substrate hereinafter) so as to oppose the segment electrode SE1 (FIGS. 4 and 6). Similarly, a common electrode CE2 is formed on a portion of the inner surface of the substrate 59 opposing the segment electrode SE2. The common electrodes CE1 and CE2 have a width of, e.g., 3 mm, and are formed parallel to each other slightly spaced by about 30 $\mu$m.

The segment electrodes SE1 and SE2 and the common electrodes CE1 and CE2 are transparent electrodes. Opposing portions of the segment electrodes SE1 and SE2 and the common electrodes CE1 and CE2 and the liquid crystal composition 77 therebetween form the light shutters S for controlling transmission of light. Portions in which the shutters S are formed and portions adjacent to the shutters S, i.e., the small-gap portion between the members 63 are together defined as the shutter portion SP.

As shown in an enlarged view in FIG. 7, each segment electrode SE1 is arranged so as to be shifted by a $\frac{1}{2}$ pitch with respect to the corresponding segment electrode SE2. Therefore, the shutters S are aligned in two rows so as to be shifted by the $\frac{1}{2}$ pitch. This is to allow portions between points on the surface of the drum 21 irradiated with light transmitted through one row of light shutters S to be irradiated with light transmitted through the other row of shutters S, thereby forming a latent image having a high dot density on the surface of the drum 21. Note that when the liquid crystal apparatus is used in a printer for using the maximum, B4-size paper, for example, 1174 light shutters S are formed in one row. A pitch P1 or P2 (distances between the centers of each two adjacent shutters) is set to be about 200 $\mu$m, and a distance D between the centers of the shutters S in one row and those in the other row is set to be 260 $\mu$m.

Common connecting electrodes 81 are formed on the shutter portion SP on the inner surface of the segment substrate 59. Each electrode 81 connects each segment electrode SE1 in one row and the corresponding segment electrode SE2 in the other row adjacent to the electrode SE1 shifted by the $\frac{1}{2}$ pitch. Each electrode 81 has substantially the same width as the segment electrode. Driver connecting leads 83 for supplying power to the commonly connected segment electrodes are formed on the inner surface of the segment substrate 59. The leads 83 alternately extend upward and downward. The leads 83 are extended outside the outer seal member 61 and edge portions of the segment substrate 57. An external connecting lead 87 is formed on a distal end portion of each lead 83. The segment electrodes SE1 in one row and the segment electrodes SE2 in the other row are commonly connected for the following reason. If the leads 83 are respectively connected to the segment electrodes SE1 and SE2 in respective rows, the number of leads 83 is greatly increased and it becomes difficult to effectively form the leads 83. For this reason, in the liquid crystal apparatus according to this embodiment, each segment electrode SE1 in one row is connected to the corresponding segment electrode SE2 by one of electrodes 81. The common electrodes CE1 and CE2 are arranged to oppose the respective rows of segment electrodes in order to time-divisionally drive the liquid crystal apparatus.

Note that the segment electrodes SE1 and SE2, the electrodes 81, the leads 83 and the leads 87 are integrally formed of a transparent conductive material such as indium tin oxide.

A metal film 85 made of chromium, gold or the like is deposited on each of the electrodes 81 and the leads 83 (FIGS. 4, 5, 7 and 8). The metal film 85 is provided so as to reduce the resistance of the electrodes 81 and the leads 83. The films 85 are formed on dotted portions in FIG. 7.

It should be noted that each lead 83 is formed to have a width smaller than one side of the segment electrode SE1 or SE2. This is to reduce opposing areas of the leads 83 and the common electrodes CE1 and CE2. Thus, the capacitance of a capacitor constituted by the electrodes SE1, SE2, CE1 and CE2 becomes low. For this reason, even when a high frequency voltage is applied between the electrodes, a current flowing through the capacitor is low. As a result, a current flowing through the common electrodes CE1 and CE2 also becomes low, thus eliminating generation of Joule heat due to the high frequency current.

Metal films 89 are coated on the common electrodes CE1 and CE2. The metal films 89 are coated excluding the shutter forming portions 91 (portions opposing the segment electrodes SE1 and SE2). The metal films 89 are formed on a dotted portion in FIG. 6. The metal films 89 are provided to reduce a resistance of the common electrodes CE1 and CE2 and to define an area of a portion through which light passing through the shutters S is transmitted. The shutters S are constituted by portions 91 where the common electrodes are exposed and opposed to the segment electrodes. Each light transmission portion (a portion from which the common electrode CE1 or CE2 is exposed) 91 is formed into a rectangle having sides of lengths L1 and L2 of 90 μm.

The segment electrodes SE1 and SE2 and the common electrodes CE1 and CE2 are formed to a thickness of 20 nm to 30 nm, and the metal films 85 and 89 are formed to a thickness of about 170 nm.

Liquid crystal alignment films 93 are respectively formed on the inner surfaces of the substrates 57 and 59 to a thickness 20 to 40 nm.

Figure 8:
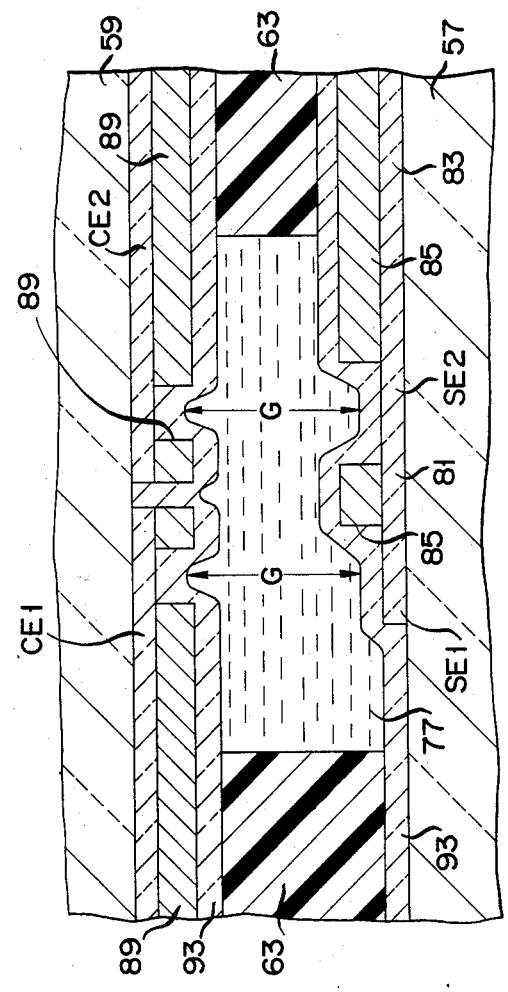
FIG. 8 is an enlarged view showing a portion near liquid crystal shutters of FIG. 4.

As shown in an enlarged view in FIG. 8, an interval of the alignment films 93 at each shutter S, i.e., a thickness G of the liquid crystal composition 77 at each shutter S is formed to be about 5.5 μm. The thickness of a liquid crystal layer between the segment electrodes SE1 and SE2 and the exposed portions 91 is formed to be about 5.5 μm.

In this embodiment, the inner seal members 63 are provided at two sides of the segment electrodes SE1 and SE2, thus decreasing a filling area of the composition 77. In other words, a width of the shutter portion SP is narrowed. This is attributed to the following reason. A dielectric constant of the composition 77 is larger than 1. If the filling area of the composition 77 is widened, the capacitance between the leads 83 and the common electrodes CE1 and CE2 is increased. When a high frequency signal is applied, a high frequency current flows into the common electrodes CE1 and CE2 through the composition 77, thus promoting generation of the Joule heat in the common electrodes CE1 and CE2. If the filling area of the composition 77 is reduced and the amount of the composition 77 to be provided in an opposing portion of the films 85 of the segment electrodes SE1 and SE2 and the common electrodes CE1 and CE2 is minimized, the capacitance can be decreased. Thus, generation of heat in the common electrodes CE1 and CE2 can be reduced. In this embodiment, in order to seal the composition 77, a two-wall structure is adopted by using the outer seal member 61 and the inner seal members 63. For this reason, introduction of fine dust or water into the layer of the composition 77 can be completely avoided.

Auxiliary segment electrodes SEO are formed at two sides of the segment electrodes SE1 and SE2 (FIG. 5). The electrodes SEO form margin erase shutters together with the common electrodes CE1 and CE2. The margin erase shutters are provided for irradiating two edge portions of the drum 21 (portions corresponding to margins at two sides of the recording paper) with light so as to discharge charges on the two edge portions of the drum 21. The margin erase shutters are driven to always be open (light can be transmitted therethrough), thereby leaving the margins at two sides of the printing paper unprinted. Test segment electrodes SET are formed outside of the electrodes SEO. The electrodes SET oppose the common electrodes CE1 and CE2, thus forming test shutters. Note that in order to form the margin erase shutters and test shutters, the metal films 89 are formed so as to expose portions 95 and 97 opposing the electrodes SEO and the electrodes SET of the electrodes CE1 and CE2 (FIG. 6). Spacers 99 for keeping an interval between the substrates 57 and 59 are formed at two sides of the electrodes SET.

A polarization plate 101 is provided on the common substrate 59.

Figure 9:
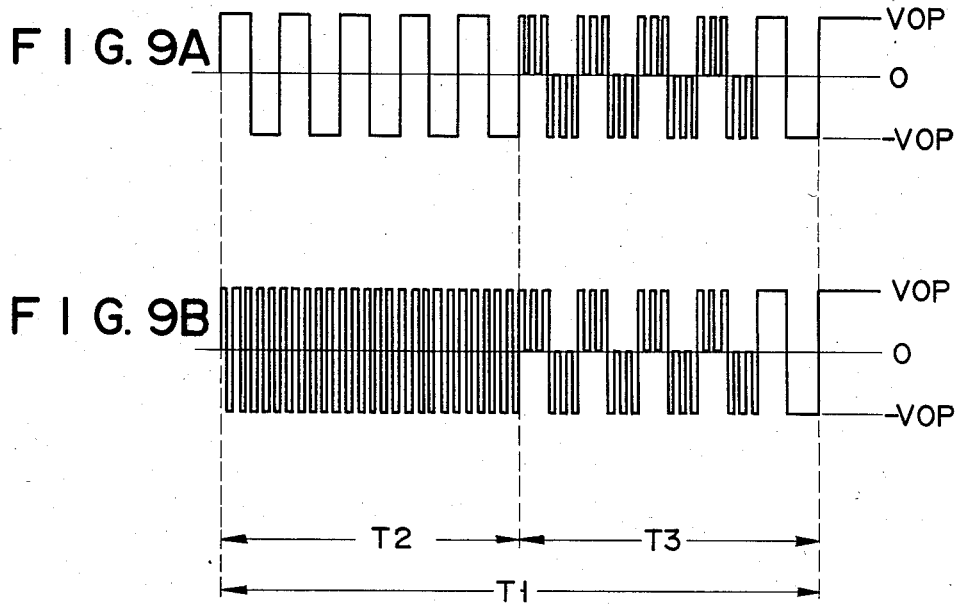
FIG. 9A is a signal waveform chart of a voltage applied between electrodes for opening the liquid crystal shutters.
FIG. 9B is a signal waveform chart of a voltage applied between the electrodes for closing the liquid crystal shutters.

As shown in FIG. 3, the liquid crystal apparatus 53 is time-divisionally driven by the two frequency addressing scheme in such a manner that a drive signal is applied between the respective segment electrodes SE1 and SE2 and the common electrodes CE1 and CE2. Basically, voltages having waveforms shown in FIGS. 9A and 9B are applied between the electrodes, thus ON/OFF controlling the shutters S. In other words, in order to open the shutters S (light can be transmitted therethrough), a drive voltage having a waveform shown in FIG. 9A is applied between the respective segment electrodes SE1 and SE2 and the common electrodes CE1 and CE2. In order to close the shutters S (light cannot be transmitted therethrough), a drive voltage having a waveform shown in FIG. 9B is applied between the electrodes SE1, SE2, CE1 and CE2. Note that FIGS. 9A and 9B show a waveform during a period T1 for controlling the shutters S. The shutters S are opened/closed in response to an enable signal (a signal during a time interval T2), and are held in an open or close state in response to a hold signal (a signal during a time interval T3).

Figure 10:
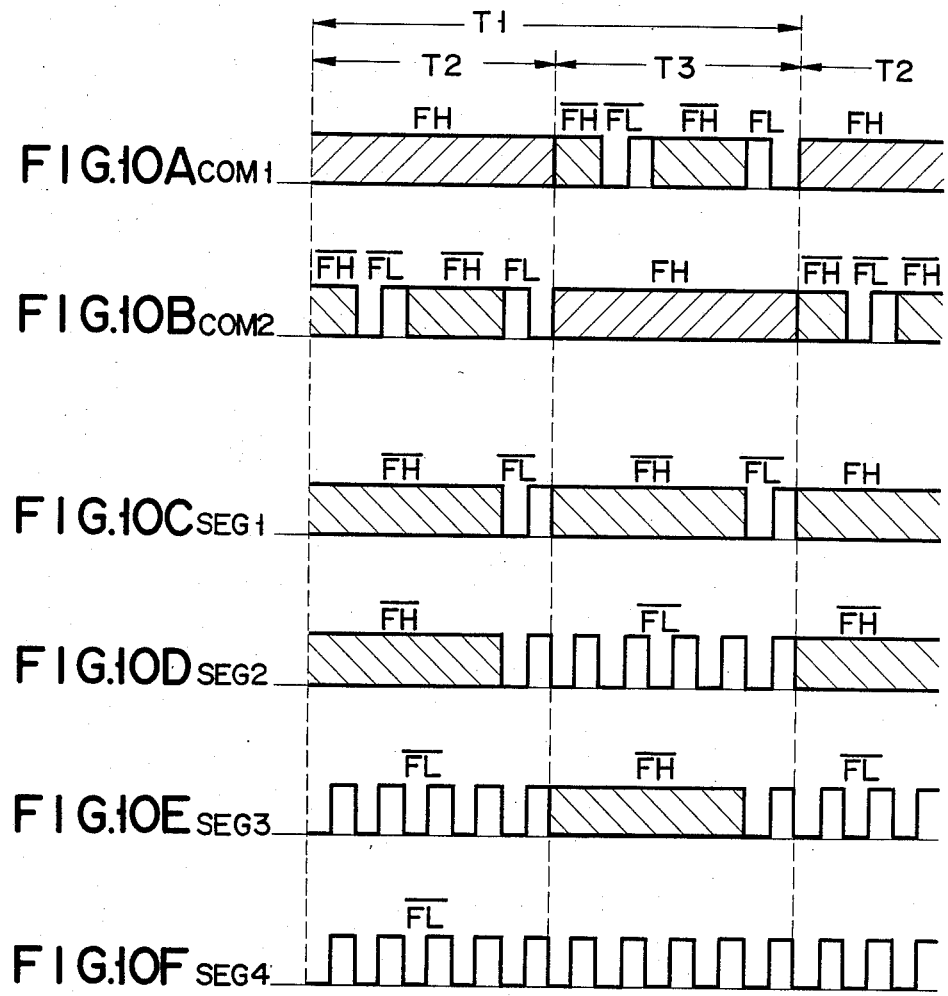
FIGS. 10A to 10F are signal waveform charts for explaining voltage signals applied between the electrodes for driving the liquid crystal apparatus.

Drive signals for controlling the liquid crystal apparatus 53 will be described in detail with reference to FIGS. 10A to 10F. FIG. 10A shows a voltage signal COM1 supplied to the common electrode CE1. FIG. 10B shows a voltage signal COM2 supplied to the common electrode CE2. The signals COM1 and COM2 have the same waveform and period T1 but phases shifted by T2 (T2=T3−1 msec). FIGS. 10C to 10F show waveforms of voltage signals SEG1 to SEG4 applied to the commonly connected segment electrodes SE1 and SE2 in synchronism with the common signals COM1 and COM2. The signal SEG1 is applied to open the shutters S at both the sides of the common electrodes CE1 and CE2. The signal SEG2 is applied to close the shutters S at the electrode CE1 side and to open the shutters S at the electrode CE2 side. The signal SEG3 is applied to open the shutters S at the electrode CE1 side and to close the shutters S at the electrode CE2 side. The signal SEG1 is applied to open the shutters S at both the sides of the electrodes CE1 and CE2.

Note that in FIGS. 10A to 10F, only low frequency signal components FL and inverted signal components $\overline{FL}$ thereof are represented by pulse waveforms and high frequency signal components FH and inverted signal components $\overline{FH}$ are represented by hatched portions. For example, in FIG. 10A, the high frequency signal FH is applied to the common electrode CE1 during the time interval T2. During the time interval T3, the inverted signal $\overline{FH}$ is applied to the electrode CE1. Thereafter, the low frequency inverted signal $\overline{FL}$ is applied to the electrode CE1, the high frequency inverted signal $\overline{FH}$ is applied thereto, and the low frequency signal FL is applied thereto, thus ending the period T1.

Figure 11:
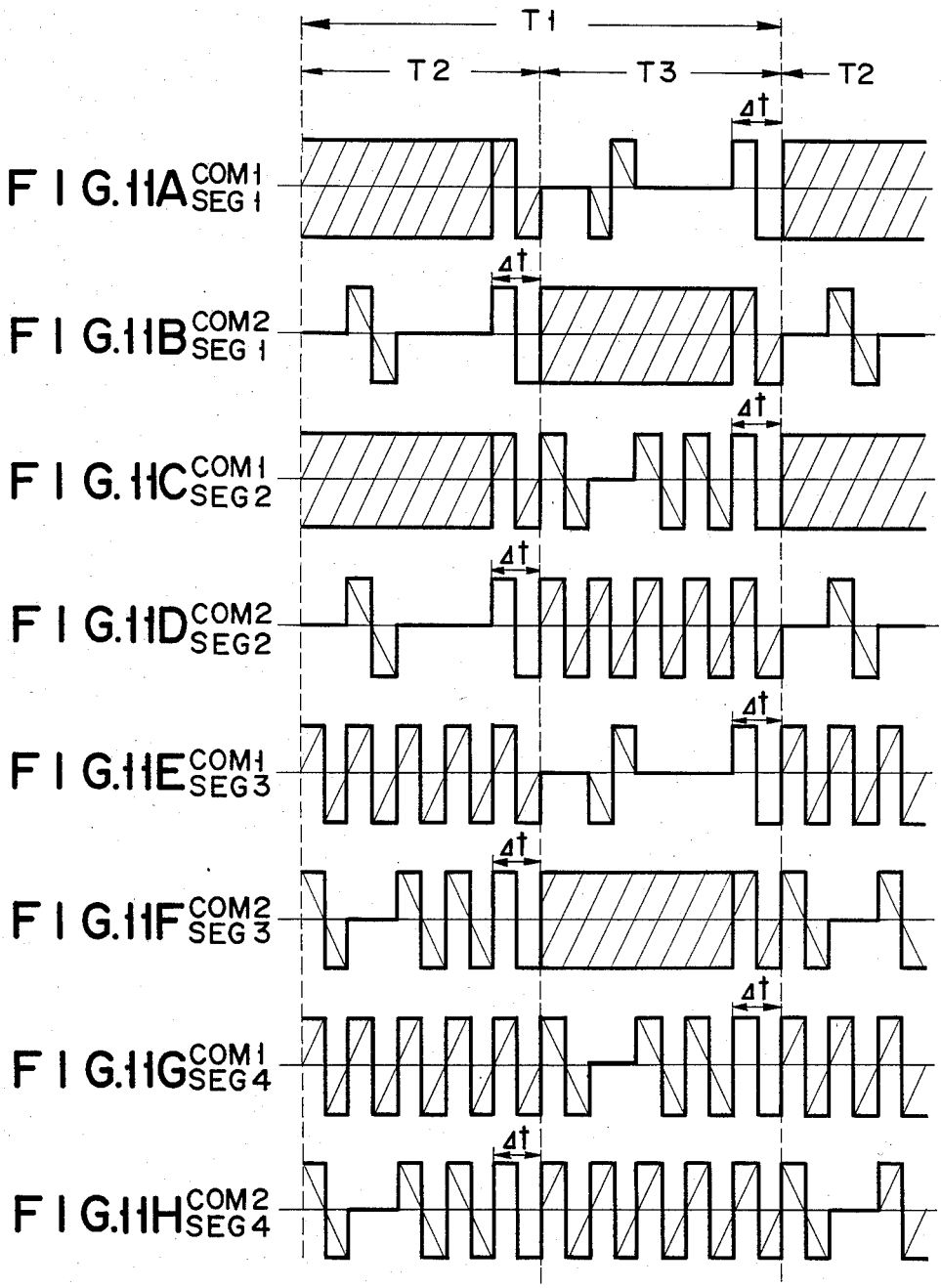
FIGS. 11A to 11H are waveform charts of an electric field applied to the liquid crystal composition when the voltage signals shown in FIGS. 10A to 10F are applied.

When signals shown in FIGS. 10A to 10F are applied to the electrodes, waveforms of electric fields applied to the liquid crystal composition 77 will be described with reference to FIGS. 11A to 11H. FIG. 11A shows an electric field applied to the composition 77 between the electrodes SE1 and the common electrode CE1 when the signal SEG1 is applied to the electrodes SE1 and SE2. In this case, a close-activate electric field (high frequency) for horizontally aligning the liquid crystal molecules is applied to the liquid crystal composition 77 during the time interval T2, and an electric field for holding the liquid crystal molecules in a horizontally aligned state is applied during the time interval T3. At the end of the interval T3, an open-activate electric field (low frequency) for vertically aligning the liquid crystal molecules is applied, and during the next time interval T2, the close-activate electric field is applied. In this manner, immediately before the close-activate electric field is applied, if the liquid crystal molecules are vertically aligned temporarily, the liquid crystal molicules cannot be strongly aligned along a horizontal direction. Although the shutters S are opened when the open-activate electric field is applied, since an open time $\Delta t$ is very short, it does not influence the optical recording operation.

FIG. 11B shows an electric field applied to the liquid crystal composition 77 between the electrodes SE2 and the electrode CE2 when the signal SEG1 is applied to the electrodes SE1 and CE2. In this case, the electric field has the same waveform as that of the electric field shown in FIG. 11A but is shifted therefrom by half the period T1.

FIG. 11C shows an electric field applied to the liquid crystal composition 77 between the electrodes SE1 and the electrode CE1 when the signal SEG2 is applied to the electrodes SE1 and SE2. FIG. 11D shows an electric field applied to the liquid crystal composition 77 between the electrodes SE2 and the electrode CE2 when the signal SEG2 is applied to the electrodes SE1 and SE2. During the time interval T2, the open-activate electric field is applied, and during the time interval T2, the hold electric field is applied.

FIG. 11E shows an electric field applied to the liquid crystal composition 77 between the electrodes SE1 and the electrode CE1 when the signal SEG3 is applied to the electrodes SE1 and SE2. During the time interval T2, the hold electric field is applied, and during the time interval T3, the close-activate electric field (low frequency) is applied. Similarly, FIG. 11F shows an electric field applied to the liquid crystal composition 77 between the electrodes SE2 and the electrode CE2 when the signal SEG3 is applied to the electrodes SE1 and SE2. FIG. 11F shows an electric field applied to the liquid crystal composition 77 between the electrodes SE1 and the electrode CE1 when the signal SEG4 is applied to the electrodes SE1 and SE2. FIG. 11H shows an electric field applied to the liquid crystal composition 77 between the electrodes SE2 and the electrode CE2 when the signal SEG4 is applied to the electrodes SE1 and SE2.

The liquid crystal composition 77 filled in the liquid crystal apparatus 53 will be described hereinafter. Table 1 shows Examples 1 to 6 of the composition 77, and shows mixing ratios of various liquid crystal compounds.

TABLE 1

| Liquid crystal compound | | Example (wt %) | | | | | |
|---|---|---|---|---|---|---|---|
| | | (1) | (2) | (3) | (4) | (5) | (6) |
| I | 1  $C_3H_7-\langle H \rangle-COO-\langle O \rangle-OC_2H_5$ | 8 | 7 | 18 | 11 | 19 | 8 |
| | 2  $C_3H_7-\langle H \rangle-COO-\langle O \rangle-OC_4H_9$ | 8 | 7 | 18 | 11 | 18 | 8 |
| | 3  $C_4H_9-\langle H \rangle-COO-\langle O \rangle-OC_2H_5$ | 7 | 7 | 17 | 10 | 18 | 7 |
| | 4  $C_3H_7-\langle H \rangle-\langle H \rangle-COO-\langle O \rangle-COOCH_3$ | 10 | 7 | | 10 | | 12 |
| | 5  $C_5H_{11}-\langle H \rangle-\langle H \rangle-COO-\langle O \rangle-COOCH_3$ | 10 | 7 | | 10 | | 12 |
| II | 6  $C_2H_5-\langle H \rangle-\langle O \rangle-COO-\langle O \rangle-CN$ | 5 | 8 | 6 | 6 | | 5 |

TABLE 1-continued

| | Liquid crystal compound | Example (wt %) | | | | | |
|---|---|---|---|---|---|---|---|
| | | (1) | (2) | (3) | (4) | (5) | (6) |
| | 7  C₅H₁₁−⟨H⟩−⟨O⟩−COO−⟨O⟩−CN | 5 | 7 | 6 | 6 | 10 | 5 |
| | 8  C₅H₁₁−⟨O⟩−⟨O⟩−COO−⟨O⟩−CN | 5 | 7 | 6 | 5 | 5 | 5 |
| | 9  C₇H₁₅−⟨O⟩−⟨O⟩−COO−⟨O⟩−CN | 5 | 6 | 6 | 5 | 5 | 5 |
| | 10 C₃H₇−⟨H⟩−⟨O⟩−COO−⟨O⟩(Cl)−CN | 5 | | | | | |
| | 11 C₅H₁₁−⟨H⟩−⟨O⟩−COO−⟨O⟩(Cl)−CN | 5 | | | | | |
| | 12 C₃H₇−⟨H⟩−⟨O⟩−COO−⟨O⟩−⟨O⟩−CN | | | | | | 7 |
| | 13 C₅H₁₁−⟨H⟩−⟨O⟩−COO−⟨O⟩−⟨O⟩−CN | | | | | | 7 |
| | 14 C₃H₇−⟨H⟩−⟨H⟩−COO−⟨O⟩−F | 8 | 8 | 7 | 8 | 8 | 8 |
| | 15 C₅H₁₁−⟨H⟩−⟨H⟩−COO−⟨O⟩−F | 7 | 7 | 7 | 7 | 7 | 7 |
| III | 16 C₅H₁₁−⟨H⟩−COO−⟨O⟩−F | | 5 | | | | |
| | 17 C₇H₁₅−⟨H⟩−COO−⟨O⟩−F | | 5 | | | | |
| IV | 18 C₃H₇−⟨H⟩−⟨O⟩−COO−⟨O⟩(CN)(CN)−OC₄H₉ | 3 | 4 | 3 | 4 | 5 | 2 |

TABLE 1-continued

| Liquid crystal compound | Example (wt %) | | | | | |
|---|---|---|---|---|---|---|
| | (1) | (2) | (3) | (4) | (5) | (6) |
| 19  $C_3H_7-\boxed{H}-\bigcirc-COO-\bigcirc-OC_5H_{11}$ (with CN, CN) | 3 | 4 | 3 | 4 | 5 | 2 |
| 20  $C_5H_{11}-\boxed{H}-\bigcirc-COO-\bigcirc-OC_4H_9$ (with CN, CN) | | 3 | 4 | 3 | 3 | |
| 21  $C_2H_5-\boxed{H}-\bigcirc-COO-\bigcirc-OC_3H_7$ (with CN, CN) | | | 3 | | | |

The liquid crystal compounds of Examples 1 to 6 have the characteristics wherein the dielectric anisotropy Δε is decreased as the frequency of an applied electric field is increased, as shown in FIG. 12. A frequency at which the dielectric anisotropy Δε becomes 0 is defined as a crossing frequency fc, a frequency 10 times the crossing frequency fc is defined as a high frequency fH, and the dielectric anisotropy at this time is defined as ΔεH. A frequency 1/10 the crossing frequency fc is defined as a low frequency fL, and the dielectric anisotropy at this time is defined as ΔεL.

Note that among the liquid crystal compounds 1 to 21 in Table 1, compounds in Group I are base compounds of the liquid crystal composition. The compounds in group I have low viscosity and good miscibility with other compounds. However, they have small dielectric anisotropy Δε and do not exhibit the dielectric scattering phenomenon. Liquid crystal compounds in group II have a large positive dielectric anisotropy ΔεL, exhibit the dielectric scattering phenomenon in which the absolute value of the dielectric anisotropy ΔεH is relatively small, and have high viscosity. These compounds are used so as to give a dielectric characteristic to the liquid crystal composition. A liquid crystal compound in group III is used when a desired dielectric characteristic cannot be obtained only by mixing a compound in group II with one in group I. Also, when the liquid crystal composition has a high viscosity upon mixing a compound in group II, a compound in group III is mixed for fine-adjustment. However, a compound in group III need not be mixed when the desired dielectric characteristic can be obtained by mixing only the compound in group II. Liquid crystal compounds in group IV are mixed so as to decrease the dielectric characteristic of the liquid crystal composition to the negative side and to decrease the crossing frequency fc. The compounds in group IV have a large negative dielectric anisotropy Δε and high viscosity.

1.2% by weight of each of two types of dichroic dyes represented by the following structural formulas were added to each of the liquid crystal compounds 1 to 6, respectively:

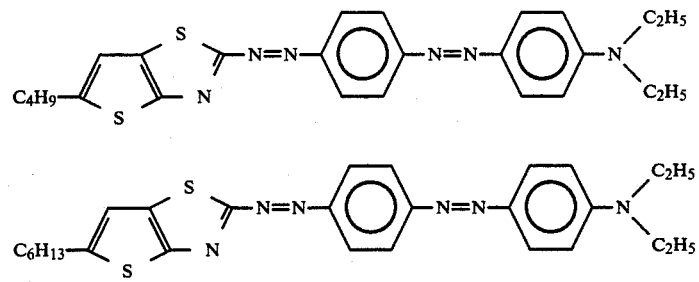

Then, this liquid crystal composition 77 was filled in the liquid crystal apparatus 53.

The liquid crystal apparatus 53 having the liquid crystal composition 77 was used in the electrophotographic printer and a shutter characteristic thereof was experimentally examined under the following conditions: Vop=25 V, T1=2 ms, T2=T3=1 ms, a low drive frequency was set to be 5 kHz, a high drive frequency was set to be 320 kHz, and a temperature was set at 20° to 30° C. Note that the liquid crystal apparatus was driven by drive signals having waveforms shown in FIGS. 9A and 9B. Note also that a light emitting wavelength range of the light source of the optical writing unit of the printer was 543±20 nm, and a light absorbing wavelength range of the dichroic dye was 560±40 nm.

Thus, results shown in Table 2 below were obtained.

TABLE 2

| Example | fc(kHz) | ΔεL | ΔεH | \|ΔεL\|/\|ΔεH\| | Time for switching open to close (msec.) | Shutter characteristic | Evaluation |
|---|---|---|---|---|---|---|---|
| (1) | 19 | +6.9 | −4.3 | 1.60 | 0.34 | Stable and good | Excellent |
| (2) | 19 | +6.0 | −3.7 | 1.62 | 0.40 | Stable and good | Excellent |
| (3) | 18.5 | +5.3 | −3.6 | 1.47 | 0.40 | Slightly poor response | normal |
| (4) | 18 | +3.9 | −3.8 | 1.03 | 0.40 | Poor response in shutter close mode due to high frequency hysteresis effect. | |
| (5) | 10.5 | +3.7 | −3.6 | 1.03 | 0.40 | Unstable shutter open/close level. | |
| (6) | 9 | +4.1 | −2.2 | 1.86 | 0.42 | Slightly poor response in shutter close mode. | |

As is apparent from Table 2, any of the liquid crystal apparatuses in which liquid crystal compounds of respective Examples are filled requires only a very short time for switching the shutter from an open state to a close state (a time for vertically aligning the liquid crystal molecules by low frequency application after high frequency application), i.e., 0.5 ms or less. This is because in these apparatuses the absolute value of the dielectric anisotropy ΔεH at high frequency is large, i.e., 2.0 or more.

In this manner, when the absolute value of the dielectric anisotropy ΔεH at the high frequency fH of the liquid crystal composition 77 is large, the time required for switching the shutters from the open state to the close state can be shortened. In contrast to this, since the high frequency hysteresis effect becomes strong, the shutter characteristic is adversely influenced so that the time required for switching the shutters from the close state to the open state is prolonged. For this reason, the response time and stability of the shutters S become poor. However, since the liquid crystal compositions of the above Examples have a dielectric anisotropy ΔεL at low frequency of 3.5 or more and the ratio |Δε|/|ΔεH| of 1.0 or more, a hysteresis effect with respect to high frequencies can be prevented.

Note that in order to reduce the hysteresis effect with respect to a high frequency electric field, the ratio |ΔεL|/|ΔεH| of the dielectric anisotropies is preferably set to be larger. However, to increase the ratio, a large amount of the liquid crystal compounds in group II, which is a relatively high viscosity, must be mixed. Due to this, the viscosity of the liquid crystal composition becomes too high and the composition cannot be used in practice. For this reason, the ratio of the dielectric anisotropies is preferably set to be 5 or less.

As shown in Table 2, the liquid crystal apparatuses using the liquid crystal compositions of Examples 1 and 2 have excellent shutter characteristics, and those using the liquid crystal compositions of Examples 3 and 6 are second to the those of Examples 1 and 2. It is seen from these results that a liquid crystal composition in which the ratio |ΔεL|/|ΔεH| of the dielectric anisotropy ΔεL to the absolute value of the dielectric anisotropy ΔεH fall within the range between 1.2 and 5 is optimum for a liquid crystal apparatus of 2 frequency addressing scheme. It should be noted that the liquid crystal apparatuses in which the compositions of Examples 4 and 5 are filled have poorer shutter characteristics than those of the liquid crystal apparatuses of the other Examples. However, the shutter characteristic of these liquid crystal apparatuses are better than those of conventional apparatuses.

In this manner, all the liquid crystal apparatuses of the above Examples use the liquid crystal compositions exhibiting a dielectric scattering phenomenon in which the absolute value of the dielectric anisotropy at a high frequency is smaller than the dielectric anisotropy at a low frequency. Therefore, even after a high frequency voltage is applied for a long period of time, since the liquid crystal molecules quickly respond to low frequency application, the liquid crystal apparatus can open/close the shutters at high speed with good response time. Since the absolute value of the dielectric anisotropy ΔεH at high frequency and the dielectric anisotropy ΔεL at low frequency are set to be sufficiently large, the liquid crystal apparatus can be driven by low voltage.

As mentioned above, influence of the hysteresis effect of a high frequency electric field depends on the strength of the electric field. Thus, when the electric field applied to the liquid crystal composition is strong, the hysteresis effect becomes strong. The strength of the electric field applied to the liquid crystal composition 77 is determined by a drive voltage and a thickness G of a layer of the liquid crystal composition 77 of the shutters shown in FIG. 8. For this reason, if the drive voltage and the thickness of the liquid crystal layer are properly selected, influence of the high frequency hysteresis effect can be reduced, and the liquid crystal molecules can respond to a low frequency voltage at high speed, thus obtaining good contrast.

In order to reduce the influence of the high frequency hysteresis effect, the shutter characteristics of the liquid crystal apparatuses having various thicknesses of the liquid crystal layer were examined under the following conditions: Vop=25 V, T1=2 ms, T2=T3=1 ms, a low drive frequency was set to be 5 kHz, a high drive frequency was set to be 320 kHz, and a temperature was set at 20° to 30° C. Note that the same liquid crystal composition 77 and dichroic dyes as in the above-mentioned apparatuses were used. The liquid crystal apparatuses were driven by the drive signals having waveforms shown in FIGS. 9A and 9B. Results shown in Table 3 below were obtained.

On the other hand, the shutter characteristics of the apparatuses respectively having the thickness G of the liquid crystal layer of 5.4 μm and 6.5 μm were examined when the drive voltage was set to be 25 V and 27.5 V. Results shown in Table 4 were obtained.

TABLE 3

| Thickness G of liquid crystal layer | α Value (α = V/G) V = 25 V | Shutter characteristic | Evaluation |
| --- | --- | --- | --- |
| 4.0 μm | 6.25 | Unstable shutter open/close level | poor |
| 4.5 μm | 5.56 | Slightly unstable shutter open/close level | normal |
| 5.0 μm | 5.0 | Stable and good shutter characteristic | excellent |
| 5.5 μm | 4.55 | Stable and good shutter characteristic | |
| 6.5 μm | 3.85 | Weak electric field strength and slightly poor response | normal |
| 7.4 μm | 3.38 | Weak electric field strength and poor response | poor |

TABLE 4

| Drive voltage (V) | Thickness G of liquid crystal layer (μm) | α Value (α = V/G) | Shutter characteristic | Evaluation |
| --- | --- | --- | --- | --- |
| 25 | 5.4 | 4.63 | Stable and good characteristic | excellent |
| 27.5 | 5.4 | 5.09 | Good but slightly unstable characteristic | normal |
| 25 | 6.5 | 3.85 | Weak electric field strength and slightly poor response | normal |
| 27.5 | 6.5 | 4.23 | Stable and good characteristic | excellent |

From the above experimental results, it was found that if the thickness G fell within the range satisfying the following relation, a satisfactory shutter characteristic could be obtained:

$$4.5\ \mu m \leq 6.5\ \mu m$$

On the other hand, if the thickness G of the liquid crystal layer becomes smaller than the above range, the electric field becomes strong and the high frequency hysteresis effect also becomes strong, thus degrading the response time. If the thickness G is set to be small, since a dye concentration in the liquid crystal composition becomes low, required light absorption cannot be performed to close the shutters S. If the thickness G is set to be large, since the strength of the electric field applied to the liquid crystal becomes low, the response time of the liquid crystal composition becomes poor. Therefore, if a constant α (V/G) determined by the drive voltage V and the thickness G of the liquid crystal layer falls within the following range, the influence of the high frequency hysteresis effect can be reduced, the liquid crystal molecules can respond at high speed to a low frequency voltage and good contrast can be obtained.

$$3.8\ V/\mu m \leq \alpha \leq 6.5\ V/\mu m$$

In the above embodiment, the liquid crystal reservoir portions 71 and 73 communicating with the liquid crystal shutter portion SP are provided. Thus, a change in pressure of the liquid crystal composition 77 due to a change in ambient temperature can be absorbed by a change in size of the cell container. In other words, at a high temperature, as the internal pressure of the portions 71 and 73 is increased, a liquid crystal sealing container (i.e., liquid crystal substrates and the like) expands outwardly. On the other hand, at a low temperature, as the internal pressure of the portions 71 and 73 is decreased, the cell container shrinks. Therefore, even if a narrow stripe-shaped liquid crystal shutter portion SP is used, a pressure change due to expansion or shrinkage of the liquid crystal composition 77 due to a change in ambient temperature can be absorbed by deformation of the portions 71 and 73. For this reason, air bubbles will not form in the liquid crystal composition 77 and a leakage will not occur. That is, reliability with respect to a change in ambient temperature can be improved.

An experiment for confirming an effect of the liquid crystal reservoir portions was then conducted under the following conditions. Various sizes of liquid crystal reservoir portions 71 and 73 were set. Five types of shutter portions SP and liquid crystal reservoir portions 71 and 73 were prepared. The experimental results shown in Table 5 were obtained.

TABLE 5

| | Liquid crystal shutter portion (Width × Length) | Liquid crystal reservoir portion (Width × Length) |
| --- | --- | --- |
| 1 | 280 mm × 1 mm | 8.4 mm × 2.4 mm |
| 2 | 280 mm × 1 mm | 8.4 mm × 5.4 mm |
| 3 | 280 mm × 1 mm | 8.4 mm × 8.4 mm |
| 4 | 280 mm × 1 mm | 8.4 mm × 11.4 mm |
| 5 | 280 mm × 1 mm | 8.4 mm × 11.4 mm |

Note that in (3) and (4) shown in the above table, the test electrodes SET and seal members 99 were provided.

The experiments in which the ambient temperature was abruptly increased from 0° C. to 80° C. and was decreased to 0° C. again were repeated 20 times at 15-minute intervals.

As a result, in (1), (2) and (3), air bubbles occurred in the cell containers. However, in (4) and (5), air bubbles did not occur, and it was confirmed that characteristics were good.

Note that in the above embodiment, the liquid crystal reservoir portions 71 and 73 are provided at two ends of the liquid crystal shutter portion SP along its lengthwise direction. However, the present invention is not limited to this. For example, a single liquid crystal reservoir portion can be provided at a central portion of the liquid crystal shutter portion along its lengthwise direction. A position, number and structure of the liquid crystal reservoir portions are not limited to those in the above embodiment.

In the above embodiment, a width of portions of the lead electrodes 83 opposing the common electrodes CE1 and CE2 is set to be narrower than the width of segment electrodes. For this reason, the capacitance between the lead electrodes 83 and the common electrodes CE1 and CE2 is lower than that of the conventional apparatus. Thus, when a high frequency signal is applied between the electrodes, a current flowing through the capacitance becomes low. Therefore, heat generated by this current can be reduced.

An experiment for confirming an effect in view of heat generation was conducted using the liquid crystal apparatus with the above arrangement. The width of the lead electrodes 83 was varied, and an increase in temperature when the high frequency voltage was applied was measured. The experiment was conducted under the following conditions. The total length and width of the common electrodes CE1 and CE2 were respectively set to be 15 mm and 3 mm, and the pitch of the shutters S was set to be 0.1 mm. As a high frequency drive voltage signal, a voltage of 25 V having a rectangular waveform and a frequency of 300 kHz was used.

As a result, the opposing area of the lead electrodes 83 and the common electrodes CE1 and CE2 and an increase in temperature (maximum value) due to heat generation were as shown in Table 6 when the lead electrodes SE1, SE2 had a width of 0.15 mm and the width of the lead electrodes 83 was set to be 0.3 mm, 0.15 mm and 0.1 mm.

TABLE 6

| Width of lead electrodes 83 | Opposing area of common electrodes CE1, CE2 and segment electrodes SE1, SE2 | Increase in temperature |
|---|---|---|
| 0.30 mm | 0.89 mm$^2$ | 4.0° C. |
| 0.15 mm | 0.50 mm$^2$ | 2.0° C. |
| 0.10 mm | 0.35 mm$^2$ | 1.5° C. |

As can be seen from Table 6, as the width of the lead electrodes 83 is set to be narrower than that of the segment electrodes SE1 and SE2, heat generation in a high frequency driving mode can be controlled, thus obtaining a good effect.

In this embodiment, if an increase in resistance of the lead electrodes 83 due to a decrease in width thereof is considered, the width thereof is preferably set to fall within the range between 0.15 mm and 0.10 mm. The opposing area is preferably set to be 0.50 mm$^2$ or less, e.g., about 0.35 mm$^2$.

In this manner, when the width of the lead electrodes 83 is set to be narrower than one side of the segment electrodes SE1 and SE2 and the opposing area of the lead electrodes 83 and the common electrodes CE1 and CE2 is set to be small, heat generation can be effectively controlled, and a change and degradation in operation characteristics of the liquid crystal composition 77 can be prevented. Also, power consumption can be reduced.

Various values are not limited to those shown in the above examples, and can be arbitrarily set. For example, the drive voltage signal waveforms are not limited to those shown in FIGS. 10A to 10F. If proper operation is assured, they can be arbitrarily set.

In the above embodiment, a liquid crystal apparatus is used in an electrophotographic printer. However, the present invention is not limited to this, and can be applied to various types of liquid crystal apparatuses such as a television receiver, computer display and the like. On the other hand, the present invention is not limited to a liquid crystal apparatus of G-H type and can be applied to a liquid crystal apparatus of TN type.

What is claimed is:

1. A liquid crystal apparatus, comprising:
   a first substrate and a second substrate in opposing relation and forming a predetermined space between one another;
   at least one first electrode formed on an inner surface of said first substrate;
   at least one second electrode formed on an inner surface of said second substrate to oppose said first electrode;
   a layer of liquid crystal composition having a molecular axis and interposed between said first electrode and said second electrode, said composition including a nematic liquid crystal material capable of use in a two-frequency addressing scheme for selectively inducing a dielectric scattering phenomenon is said composition, wherein a positive dielectric anisotropy is exhibited by said composition in response to an electric field at a frequency lower than a crossover frequency at which the dielectric anisotropy becomes nil, and a negative dielectric anisotropy is exhibited by said composition in response to an electric field at a frequency higher than said crossover frequency;
   a seal member associated with said substrates for sealing said layer of liquid crystal composition in said predetermined space; and
   means for selectively applying one of a high-frequency electric field and a low-frequency electric field to said layer of liquid crystal composition through said first and said second electrodes, and for applying to said first and said second electrodes a signal having a frequency lower than said crossover frequency to align the molecular axis of said liquid crystal composition with a line perpendicular to said first and said second substrates, and a signal having a frequency of at least 185 KHz to align said molecular axis with a line parallel to said first and said second substrates.

2. An apparatus according to claim 1 wherein said liquid crystal composition has a dielectric characteristic such that its dielectric anisotropy in response to an applied electric field having a low frequency 1/10 said crossover frequency is larger than the absolute value of its dielectric anisotropy in response to an applied electric field having a high frequency 10 times said crossover frequency.

3. An apparatus according to claim 2, wherein said liquid crystal composition has a dielectric characteristic such that its dielectric anisotropy in response to the applied electric field having the low frequency 1/10 the crossover frequency is larger than 3.5, and the absolute value of its dielectric anisotropy in response to the applied electric field having the high frequency 10 times the crossover frequency is larger than 2.0.

4. An apparatus according to claim 3, wherein the ratio of dielectric anisotropy of said composition in response to the applied electric field having the low frequency, to the absolute value of its dielectric anisotropy in response to the applied electric field having the high frequency, is in the range of 1.2 to 5.

5. An apparatus according to claim 4, wherein said liquid crystal composition comprises:
a mixture of a plurality of liquid crystal compounds each in a nematic liquid crystal phase; and
a dichroic dye dissolved in the mixture.

6. An apparatus according to claim 1, including means for applying a voltage between said first and said second electrides at a ratio within a range between 3.5 {V/μm} and 5.8 {V/μm} relative to the thickness of said composition layer between said electrodes.

7. An apparatus according to claim 6, wherein the thickness of said liquid crystal composition between said first and second electrodes falls within a range between 4.5 {μm} and 6.5 {μm}.

8. An apparatus according to claim 6, wherein the voltage applied between the first and second electrodes falls within a range between 25 {V} and 27.5 {V}.

9. An apparatus according to claim 1, including means for applying a voltage between said first and said second electrodes at a ratio within a range between 4 {V/μm} and 5 {V/μm} relative to the thickness of said composition layer between said electrodes.

10. An apparatus according to claim 1, including aligning films formed on the opposing inner surfaces of said first and said second substrates and on the opposing surfaces of said first and said second electrodes, so that the molecules of the liquid crystal composition are aligned in one direction parallel to the surfaces of said first and said second substrates when no electric fields are applied to said layer of liquid crystal composition.

11. An apparatus according to claim 10, wherein said liquid crystal composition has a dielectric characteristic such that its dielectric anisotropy in response to the applied electric field having said low frequency 1/10 the crossover frequency is larger than 3.5, and the absolute value of its dielectric anisotropy in response to the applied electric field having said high frequency 10 times the crossover frequency is larger than 2.0.

12. An apparatus according to claim 11, wherein the ratio of dielectric anisotropy of said composition in response to the applied electric field having said low frequency, to the absolute value of its dielectric anisotropy in response to the applied electric field having said high frequency, is in the range of 1.2 to 5.

13. An apparatus according to claim 12, wherein said liquid crystal composition comprises:
a mixture of a plurality of liquid crystal compounds, each in a nematic liquid crystal phase; and
a dichroic dye dissolved in the mixture.

14. An apparatus according to claim 10, including means for applying a voltage between said first and said second electrodes at a ratio within a range between 3.5 {V/μm} and 5.8 {V/μm} relative to the thickness of said composition layer between said electrodes.

15. An apparatus according to claim 14, wherein the thickness of said liquid crystal composition between said first and said second electrodes falls within a range between 4.5 {μm} and 6.5 {μm}.

16. An apparatus according to claim 15, including means for applying a voltage between said first and said second electrodes at a ratio within a range between 4 {V/μm} and 5 {V/μm} relative to the thickness of said composition layer between said electrodes.

17. An apparatus according to claim 10, wherein said liquid crystal composition has a dielectric characteristic such that its dielectric anisotropy in response to the applied electric field having said low frequency 1/10 the crossover frequency is larger than 3.5, and the absolute value of its dielectric anisotropy in response to the applied electric field having said high frequency 10 times the crossover frequency is larger than 2.0; and including means for applying a voltage between said first and said second electrodes at a ratio within a range between 3.5 {V/μm} and 5.8 {V/μm} relative to the thickness of said composition layer between said electrodes.

18. An apparatus according to claim 17, wherein the ratio of dielectric anisotropy of said composition in response to the applied electric field having said low frequency, to the absolute value of its dielectric anisotropy in response to the applied electric field having said high frequency, is in the range of 1.2 to 5.

19. An apparatus according to claim 17, wherein said liquid crystal composition comprises:
a mixture of a plurality of liquid crystal compounds each in a nematic liquid crystal phase; and
a dichroic dye dissolved in the mixture.

20. An apparatus according to claim 19, including means for applying a voltage between said first and said second electrodes at a ratio within a range between 4 {V/μm} and 5 {V/μm} relative to the thickness of said composition layer between said electrodes.

* * * * *

UNITED STATES PATENT AND TRADEMARK OFFICE
CERTIFICATE OF CORRECTION

PATENT NO. : 4,688,899

DATED : August 25, 1987

INVENTOR(S) : FUJIMURA et al

It is certified that error appears in the above-identified patent and that said Letters Patent is hereby corrected as shown below:

Title page, left-hand side, "Foreign Application Priority Data", "59-113437" should be -- 59-113437(U) --

Signed and Sealed this

Fifth Day of April, 1988

Attest:

DONALD J. QUIGG

Attesting Officer

Commissioner of Patents and Trademarks